Nov. 30, 1937.  F. G. ROBINSON  2,100,519
BAG AND LIKE TUBING MACHINE
Filed Aug. 10, 1936  7 Sheets-Sheet 1
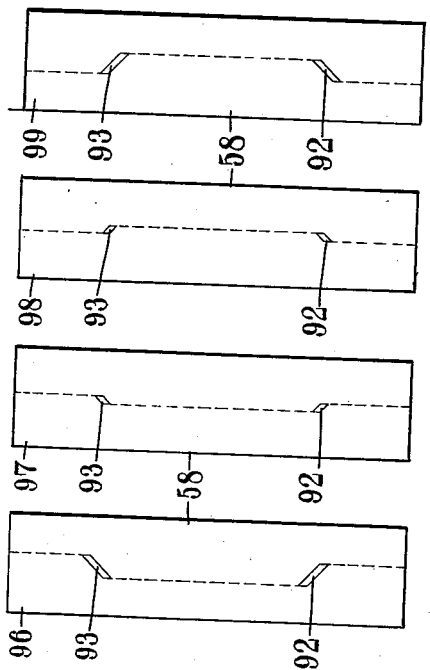
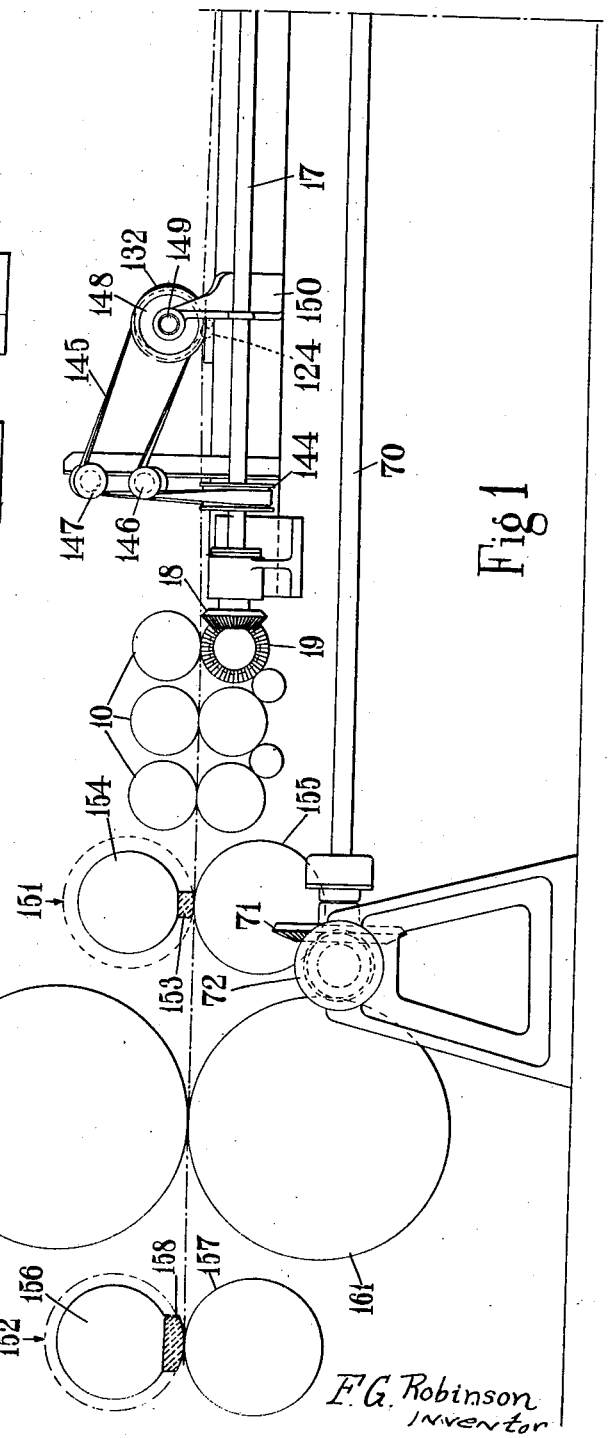

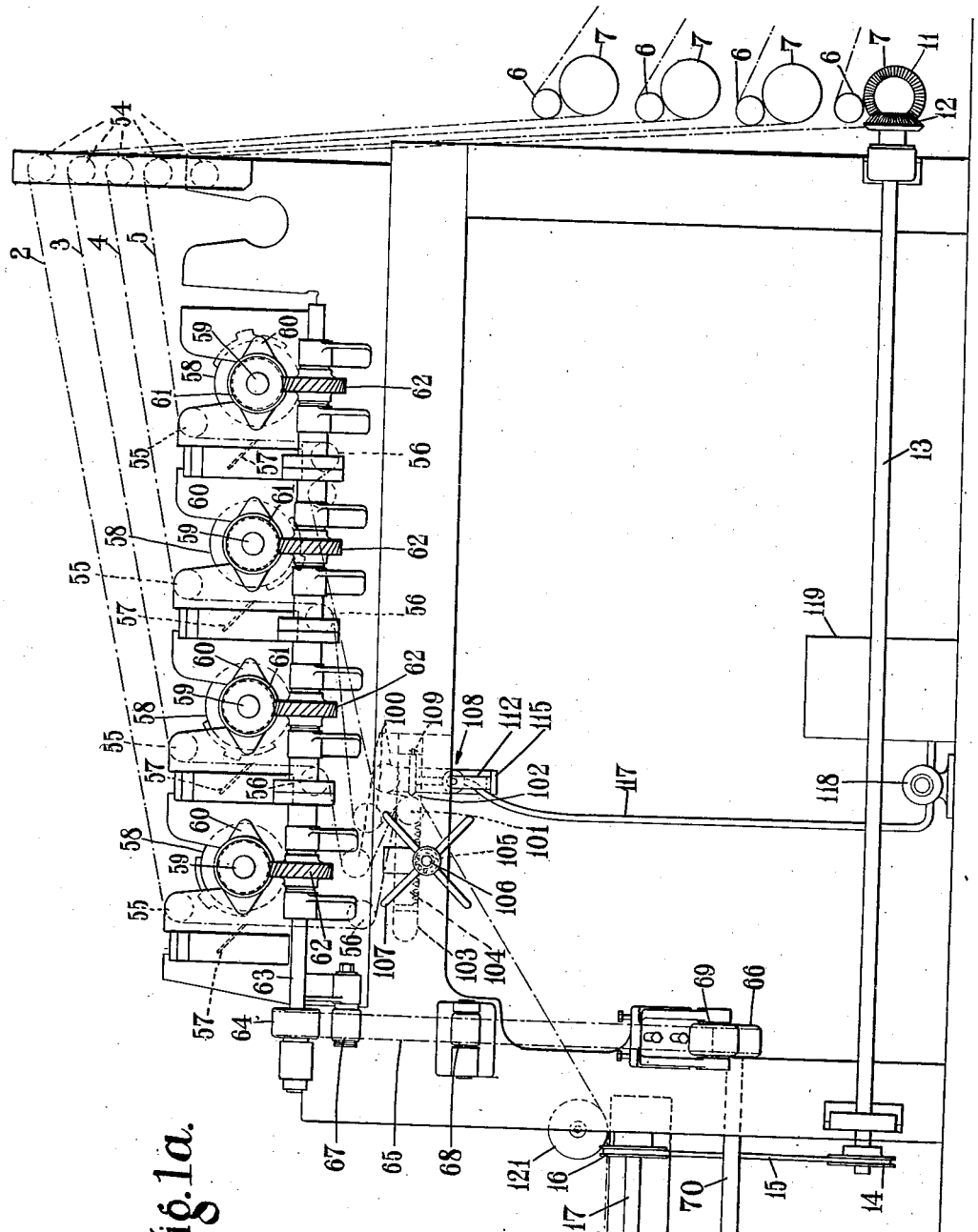

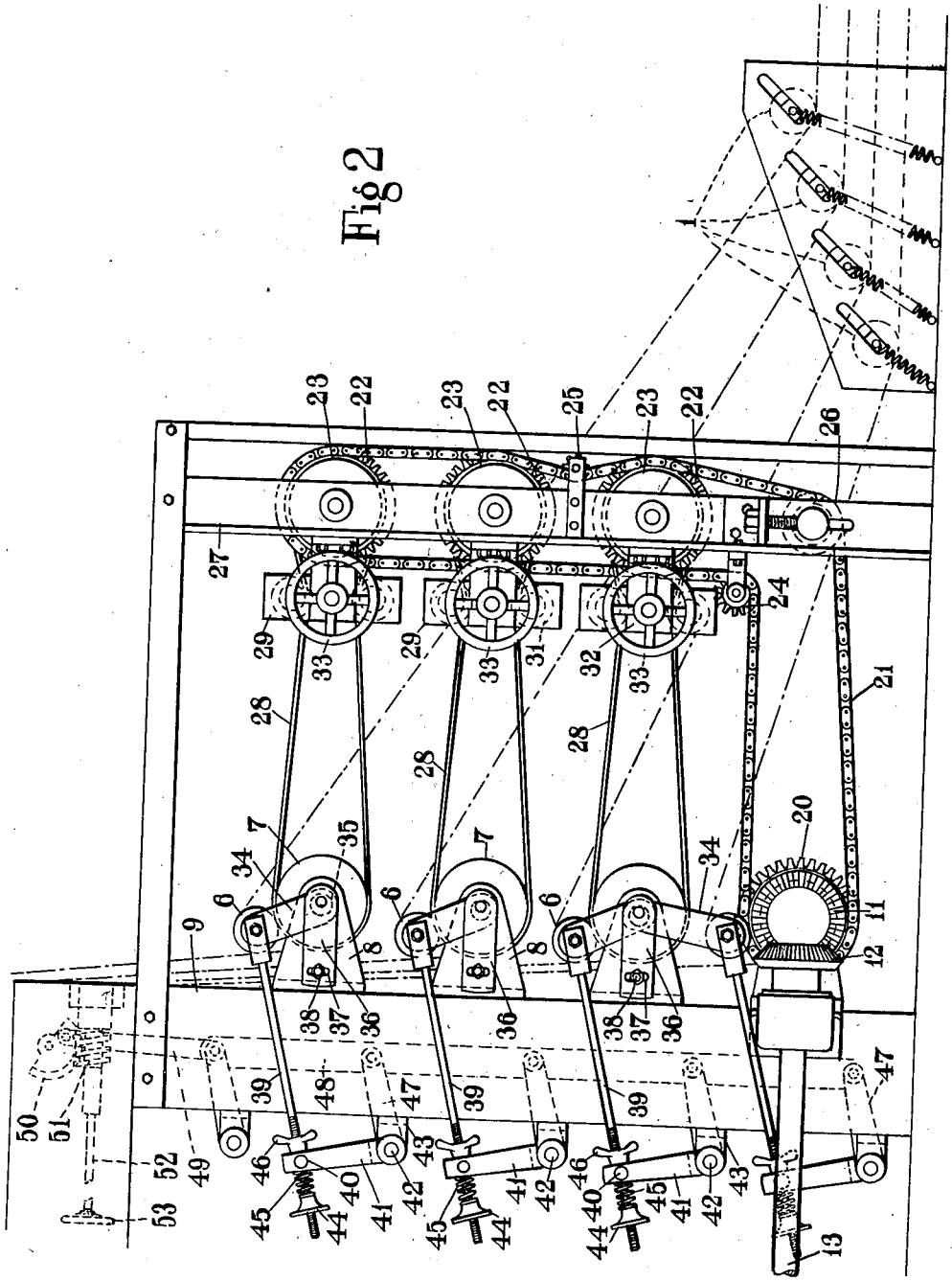

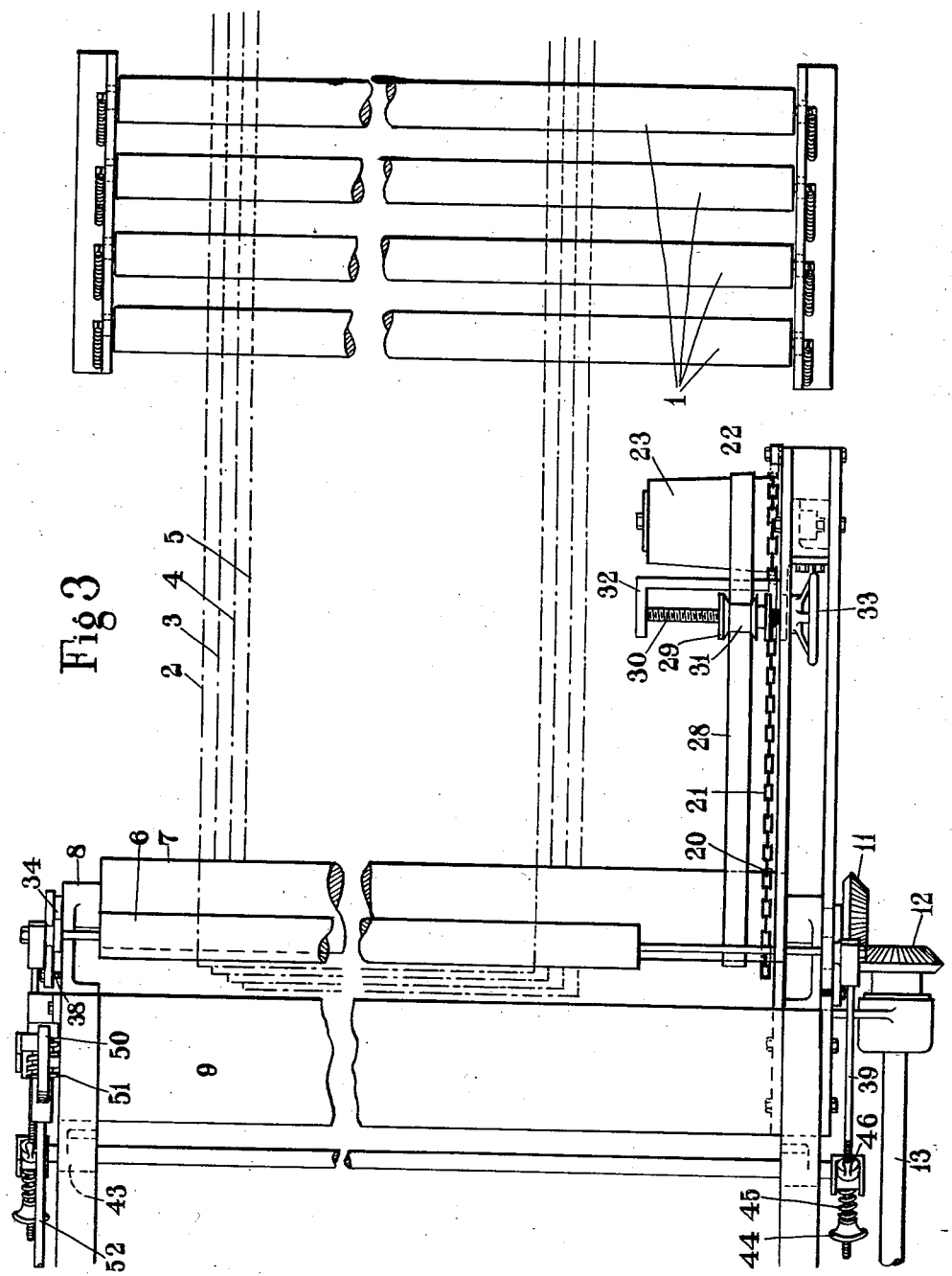

Nov. 30, 1937.                F. G. ROBINSON                 2,100,519
                         BAG AND LIKE TUBING MACHINE
                            Filed Aug. 10, 1936           7 Sheets-Sheet 5
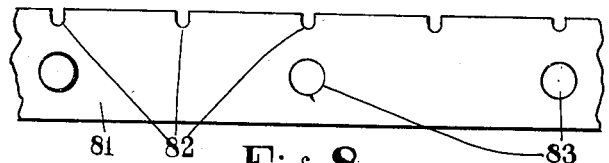
Fig 8
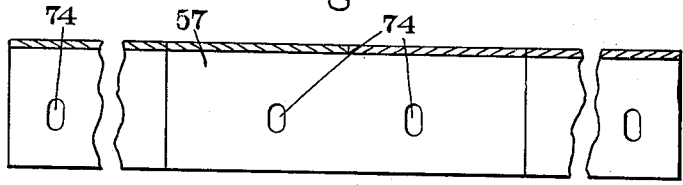
Fig 4
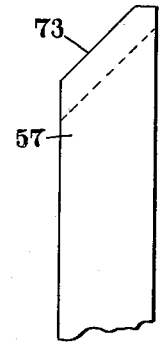
Fig 5
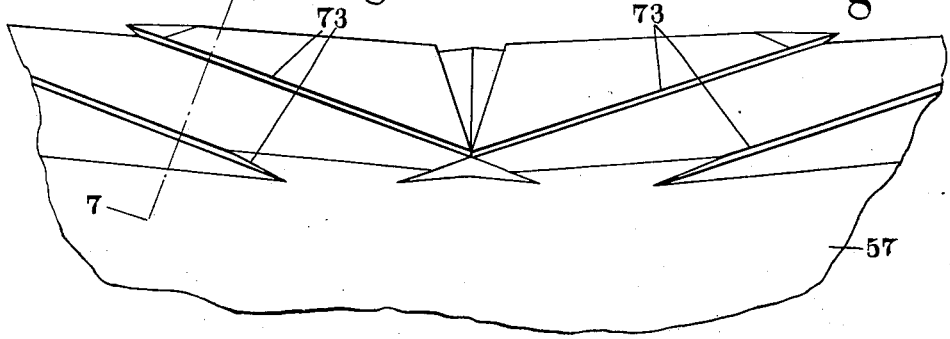
Fig 6
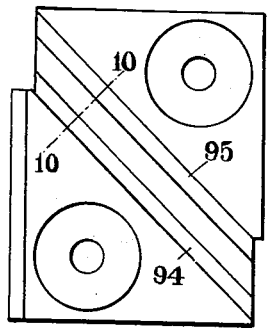
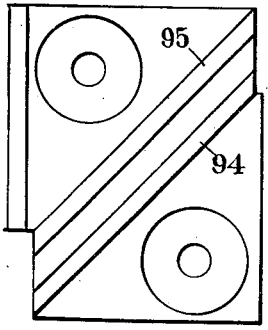
Fig 9
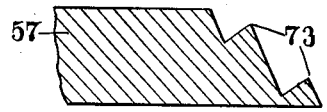
Fig 7
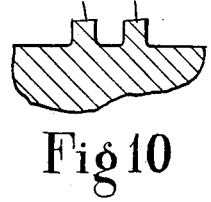
Fig 10
F. G. Robinson
Inventor
By Glascock Downing & Seebold
Attys.

Nov. 30, 1937.  F. G. ROBINSON  2,100,519
BAG AND LIKE TUBING MACHINE
Filed Aug. 10, 1936  7 Sheets-Sheet 6

F. G. Robinson
INVENTOR
By Glascock Downing & Seebold
Attys.

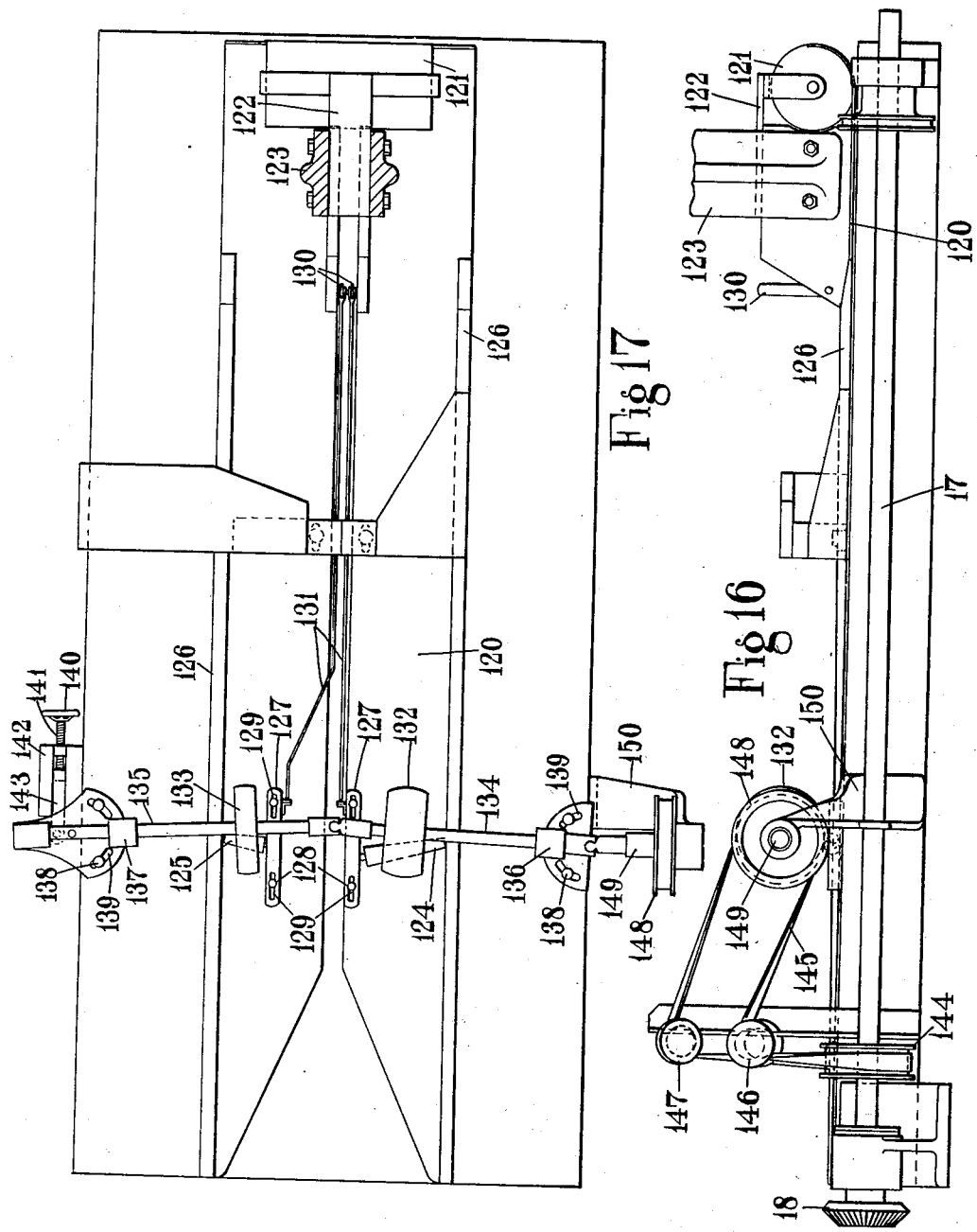

Patented Nov. 30, 1937

2,100,519

UNITED STATES PATENT OFFICE 2,100,519

BAG AND LIKE TUBING MACHINE

Foster Gotch Robinson, Bristol, England, assignor of one-half to Paper Sacks Limited, Bristol, England Application August 10, 1936, Serial No. 95,242
In Great Britain August 14, 1935

19 Claims. (Cl. 93—19)

This invention relates to paper bag and like tubing machines and has for its object the provision of a machine or mechanism adapted to enable bag tubes, particularly multiply tubes, having a notched or shoulder end or ends, to be continuously produced by a high rate of speed ready for having their end or ends closed by a bottom-forming operation, the invention being especially useful in the production of tubes for making improved block bottom bags such as described in my application Serial No. 37,757, filed August 24, 1935. A further aim of the invention is to provide improved means for perforating webs on given lines or to a given configuration whilst the webs are continuously travelling.

The invention may be applied in reference to the method of forming bag tube lengths described in British patent specification No. 343,447 which consists in perforating a series of webs on transverse lines to afford the desired configuration for the tube end-closing or bottom-forming operation, folding the perforated webs into a nested series of tubes and in intermittently tensioning the formed tube to detach progressively the end bag length of the tube at the perforations.

According to the invention the perforating means comprise a rectilinear dead knife and a rotary knife cooperating with the dead knife, one or other of said knives having a series of oblique cutting edges (preferably arranged in two oppositely disposed sets to relieve the paper of side thrust) which are traversed by the other knife. One of the knives may be provided with a series of notches or interruptions. The interval between the interruptions determines the width of the perforation slits to be produced while the width of the interruptions determines the width of the material intervening between the slits. Where tubes with notches and shoulders joined together by oblique portions are to be produced, the rotary severing device is composed of offset or parallel notched blades and pairs of edges arranged parallel to one another and obliquely or at an angle with respect to the notched blades, the arrangement being such that in making the oblique cuts parallelograms are detached or cut to waste from the webs.

Where open-mouthed bags are to be made the perforating means are put out of action at every other bag length interval so that perforations occur at double bag length intervals and means may be provided for severing the double lengths midway of their perforated parts immediately after the tensioned severance has taken place.

Web tension controlling means may be provided acting in conjunction with the forward tube draw rolls appropriately to tension individually the webs as they pass between the perforating means. According to one form the web tension controlling means comprise a web draw roller for each web having a displaceable guide roller associated therewith to provide a variable web contact and rotated at the same speed as the forward draw rolls or rotated at a greater or less speed to have an accelerating or retarding effect on the webs as required.

In order to maintain the folding of the composite tube on lines correctly registered with reference to the required relative position of the shoulders and notches on the several plies, and in order to maintain the longitudinal overlapping margins which are secured together in correct register for forming the tube an adjustable skew friction drive is employed in the region of the folding plate and co-operating with conical rollers adapted to apply inward thrust to the wings of the webs being folded and advanced or retarded one side or the other.

The detaching and tension means preferably comprise two sets of rotary gripping surfaces at bag length intervals operating in synchronism, one set adapted to hold the tube, for which purpose it operates at slightly less than paper speed, while the other set advances the tube end applying thereby sudden tension and breaking off the foremost bag length at the perforations. The rotary gripping means preferably comprise rotary rubber segments each co-operating with an opposed roller.

A convenient embodiment of the invention is illustrated in the accompanying drawings in which:—

Figures 1 and 1a taken together show diagrammatically a side view of a bag tubing machine according to the invention.

Figure 2 is a side view of the feed end of the machine looking on the drive side and showing the web draw rollers and associated mechanism.

Figure 3 is a plan view of Figure 2.

Figure 4 is a view of a dead knife, parts being broken away.

Figure 5 is an enlarged end view of the dead knife.

Figure 6 is an enlarged detail of the central portion of the dead knife showing the arrangement of the cutting edges.

Figure 7 is a sectional view of the dead knife taken on the line 7—7 of Figure 6.

Figure 8 is a view of a portion of the rotary knife blade.

Figure 9 shows a pair of oppositely disposed oblique cutters which may form part of the rotary knife.

Figure 10 is a sectional detail taken on line 10—10 of Figure 9.

Figure 13 is a diagrammatic view showing the arrangement of four rotary knives for perforating the webs to produce a four ply bag tube having a notched and shouldered end or ends.

Figure 16 is a side elevation of the former plate and associated parts, and

Figure 17 is a plan view of Figure 16.

Figures 14, 15:
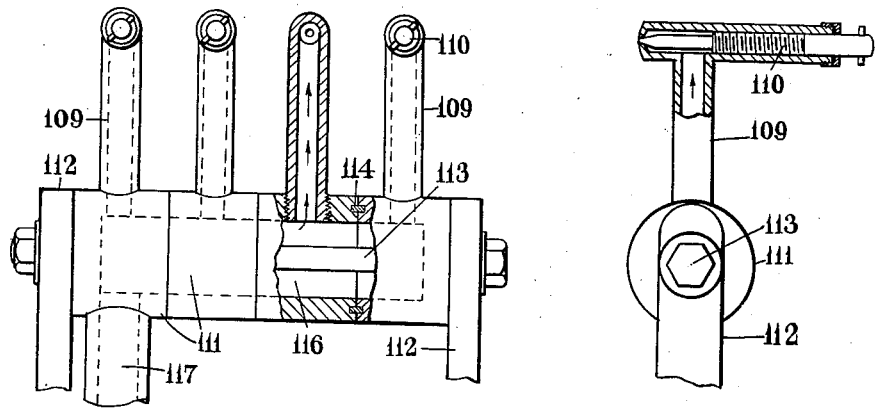
Figures 14 and 15 are front and end views respectively of a pasting device, parts being shown in section.

In carrying the invention into effect according to one convenient mode as applied more particularly to a machine for producing bag tubes as described in my application Serial No. 37,757, filed August 24, 1935, that is to say, a bag tube the end or ends of which have notches and shoulders joined by oblique lines, a bag tubing machine having the usual general characteristics is provided with a series of resiliently mounted guide rolls 1 (Figures 2 and 3) to which the webs are led from a series of paper reels (not shown) having the usual brakes controlling the unreeling of the paper.

In the illustrated embodiment of the invention the machine is adapted for the production of four ply bag tubes, the four webs 2, 3, 4 and 5 being fed from the reels to the guide rollers 1 so that their side margins overlap one another or are staggered relatively to one another as shown in plan in Figure 3.

From the guide rollers 1 the webs are led to a corresponding number of retarding or tension controlling means each comprising a displaceable guide roller 6 covered with rubber or other suitable material and a web draw roller 7. The rollers 7 are mounted in brackets 8 secured to the machine framework 9 in vertically spaced relation. These web draw rollers are adapted to be driven from the forward tube draw rolls 10 of the machine and serve to draw the webs from the reels against the action of the reel brakes and means is provided for independently varying the speed of each roller 7 so that appropriate tension of the individual webs and equalization of relative tension on the webs as they pass through the machine, and particularly the perforating means hereinafter described may be obtained and adjustments may be made to compensate for different surfaces, and stretch of paper used and for varying settings of the reel brakes.

As shown, the lowermost roller 7 has mounted on its spindle on the drive side of the machine a bevel gear 11 which is in mesh with a bevel gear 12 on one end of a driven shaft 13. The shaft 13 has secured on its other end a sprocket 14 adapted to be driven by a chain 15 from a sprocket 16 of a shaft 17 driven from the draw rolls 10 through suitable bevel gears 18, 19. Secured to the lowermost roller 7 adjacent the drive side is a sprocket 20 which, through a chain 21, drives a series of sprockets 22 each secured to a cone pulley 23. Suitable guide sprockets 24, 25 are provided for the chain 21 which can be suitably tensioned by an adjustable jockey 26.

The cone pulleys 23 are spaced vertically to correspond with the upper three rollers 7 and are rotatably mounted on stub shafts suitably secured to a vertical frame member 27. The cone pulleys are adapted to drive the upper three rollers 7, the ends of which may also be tapered or coned, through endless belts 28, each of which has a belt shifting device associated therewith whereby each belt may be independently moved along its cone pulley to adjust or vary the speed of the associated roller 7 within small limits. Each belt shifting device consists of a carriage 29 threaded on a screwed spindle 30 and carrying pulleys 31 for engaging the upper and lower runs of the belt 28. The screwed spindle bears in a bracket 32 secured to the frame 27 and has a hand wheel 33 secured on its end for manipulation by the operator.

Each rubber covered guide roller 6 is carried by and rotatably mounted in a pair of arms 34 the lower ends of which are rotatably mounted on eccentrics 35 loosely engaging reduced projections of the web draw roller spindle. The eccentrics are secured to or formed integral with lever arms 36 which are adjustably secured to the bearing brackets 8 of the roller 7 so as to be capable of adjusting the eccentrics about the projections of the roller spindle. For this purpose the lever arms 36 are provided with an arcuate slot 37 through which the securing bolt 38 extends. The upper end of each of the pair of arms 34 is secured to a connecting rod 39 having a threaded end passing through a trunnion 40 carried by a lever 41, the two levers 41 associated with each guide roller 6 being secured to a spindle 42 extending transversely of the machine and bearing in brackets 43 of the framework 9. An adjusting nut or hand wheel 44 is threaded on the end of each connecting rod and between this hand wheel and the trunnion 40 a spring 45 is located whereby the arms 34 and hence the rubber covered rollers 6 are resiliently urged towards the levers 41, the tension of the springs 45 being adjustable by manipulation of the hand wheels 44. The position of the rollers 6 may be adjusted by manipulation of wing nuts 46 threaded on the connecting rods on the roller side of the trunnions 40. The rubber covered guide roller 6 associated with the lowermost roller 7 is provided with similar adjusting means but, as this lowest roller 7 has the gear 20 mounted on its spindle, the arms 34 of this particular adjusting means are mounted on the eccentrics 35 of the roller 7 next above.

It will be appreciated that the webs from the guide rollers 1 first pass counter-clockwise (viewed from the drive side of the machine) around the rubber covered guide rollers 6 from which they pass clockwise around the web draw rollers 7 and due to the guide rollers 6 being carried by the eccentrically mounted arms these guide rollers can be adjusted to vary the arc of contact of the webs around the driven rollers 7 whereby a nearly positive drive to the webs may be obtained. Furthermore, should undue tension or retardation at the reels be applied to any individual web leading to the rollers 7 due, for example, to unbalance or misalignment of a reel the particular guide roller 6 over which the web passes will automatically be pulled into contact with its associated roller 7, due to the eccentric mounting, against the action of the springs 45 whereby the web will be nipped between the guide roller 6 and roller 7 to give an even more positive drive to the web and thus stop or check the irregularity taking effect on that portion of the web which is passing through the machine between the roller 7 and the forward tube draw rolls 10 and particularly the perforating means.

To permit ease of threading of the webs between the rubber covered guide rollers 6 and the rollers 7 a master control is provided for swinging the guide rollers away from the rollers 7. Secured to the transverse spindles 42 on the operator's side of the machine are levers 47 which are pivoted to a common vertical bar 48. The upper extremity of this bar has pivoted thereto one end of a link 49 the other end of which is pivoted to a toothed segment 50 engaging a worm wheel 51 secured to a shaft 52 having a hand wheel 53 conveniently situated for manipulation by the operator. It will be seen that by rotating the hand wheel the toothed segment may be swung upwardly about its pivot thereby lifting the levers 47 and swinging the levers 41 counter-clockwise to pull the connecting rods to the left (Figure 2) and thus swing the rollers 6 away from the rollers 7.

The webs pass upwardly from the web draw rollers 7 over guide rollers 54 arranged in the upper part of the framework in vertically spaced relation. From these guide rollers the webs are led over further guide rollers 55, arranged in horizontally spaced relation, and beneath lower bight rollers 56 which dispose the webs in a series of spaced vertical planes between which the perforating means are located. The perforating means comprise dead knives 57 located on one side of the vertical web portions and rotary knives 58 acting against the dead knives on the other side of the vertical portions of the webs. The lower bight rollers are displaceably mounted as by being located on pivoted arms or levers or in guide slots with means for moving these rollers each independently for the purpose of setting or adjusting the length of path taken by each web after it leaves the perforating point so that the perforations in the webs lie in the correct relative position when assembled.

It will be appreciated that when changing over from one bag length to another which may be effected by changing the speed of the paper webs, by means of the usual timing gears, with respect to the operations of the knives considerable nicety of adjustment is required even after appropriate gear pinion changes have been made corresponding with the bag lengths to be perforated. The displaceable bight rollers enable the finer adjustments to be more readily effected. Alternatively to adjusting the speed of the paper webs the rotary knives may be driven through a variable or adjustable speed gear (such as for example a differential gear having means for locking it in one or other of the adjusting positions), so that the position of the cut with respect to the passage of the webs may be adjusted.

The rotary knives are of appropriate diameter and where valve bags closed at both ends are to be made from the tubes produced the rotary knives are driven to make one revolution for each bag length of web passing. The spindles 59 of the rotary knives are mounted in bearings 60 in the upper part of the machine framework and secured on the projecting end of each spindle 59 on the drive side of the machine is a skew gear 61. The skew gears 61 mesh with skew gears 62 mounted on a longitudinally extending shaft 63 which carries adjacent one end a sprocket 64 driven by a chain 65 from a sprocket 66, suitable guide sprockets 67, 68 and 69 being provided for the chain 65, the lower guide sprocket 69 being adjustably mounted. The sprocket 66 is secured to a shaft 70, which is driven by a suitable motor and variable speed gearing (not shown) through bevel gears 71, 72 (Figure 1).

When open-mouth bags are to be manufactured from the tubes the perforated cuts occur at double bag length intervals for which purpose the dead knives may be mounted upon an oscillable or reciprocable carriage which is actuated by cranks, cams or other suitable means so that the dead knife is displaced away from the rotary knife every other bag length interval with the result that perforations are produced only at double bag length intervals.

Each dead knife 57 (Figures 4 to 7) comprises a rectilinear blade which may be about ⅛ inch thick and is formed with a multitude of oblique cutting edges 73 arranged in spaced relationship and substantially parallel to one another at an angle of approximately between 10° and 20° to the lie of the blade. The angle of the edges may vary somewhat throughout the length of the blade, for example the angle of the edges may progressively decrease outwardly from the centre. The oblique edges 73 as shown in Figure 6 overlap and are oppositely disposed on each side of the centre of the blade length, see Figure 6, so that in action any side thrust upon the paper is balanced. In end view (see Figure 5) the cutting edges 73 are approximately at an angle of 45° to the plane of the knife. The dead knife is preferably formed in short sections so as to enable it to be readily bedded and adjusted in its mounting and is provided with slots 74 for mounting bolts.

Figure 11:
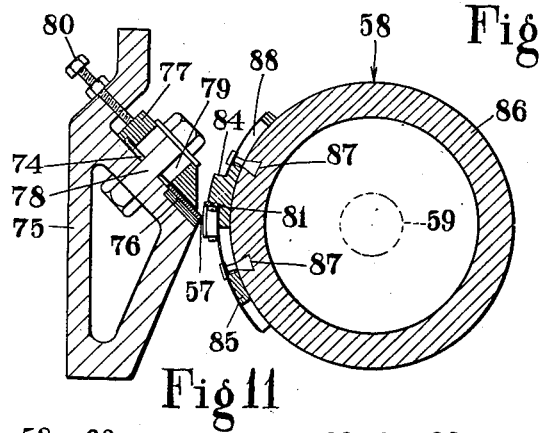
Figure 11 is a sectional view of co-operating rotary and dead knives and their mountings.

Each dead knife is resiliently mounted so that it has a slight give when in co-operation with the rotary knife. As shown in Figure 11, the knife 57 is mounted on a frame portion 75 at an angle of 45° so that the cutting edges 73 lie in a vertical plane, and is bedded on an insert 76 of rubber or other resilient material. A retainer plate 77 engages the upper and rear faces of the knife and retainer plate and knife are clamped to the frame 75 by bolts 78 which pass through the slots 74 of the knife and slots 79 of the retainer plate. Adjustment of the position of the knife may be effected by means of adjusting screws 80 engaging the rear end of the retainer plate 77.

The rotary knife 58 comprises a bar or blade 81 (Figure 8) having a series of interruptions of notches 82 which may be arranged, for example, at 1 inch intervals, the width of each notch being according to the amount of paper it is desired to leave between the perforations, or conversely according to the length of slit each perforation is to measure. The blade is provided with bolt holes 83 and, as shown in Figure 11, is secured to the underside of a projecting rib 84 of an arcuate plate 85 secured to the periphery of a cylindrical member 86 by bolts 87 which pass through slots 88 in the plate 85 whereby the latter together with the blade 81 may be adjusted relatively to the cylindrical member 86.

The notched blade 81 co-operates with the dead knife 57 so that in rotation it operates with a progressively moving point contact at each of the oblique edges on the dead knife whereby the paper is slit transversely with a shearing action excepting at those parts corresponding with the notches of the rotary knife.

The shearing action to produce the perforations may also be obtained by having the notches or interruptions in the dead knife instead of in the rotary knife which would then be a plain blade. In cases where the interruptions and the oblique cutting edges are both provided on the dead knife the interruptions may conveniently be obtained by arranging the oblique cutting edges so that instead of the top portion of one edge overlapping the bottom of the next adjacent edge as shown in Figure 6, these portions are spaced longitudinally of the knife. The invention is therefore not limited to the particular formation of dead knife and rotary knife as specifically described and shown in the drawings.

In cases where perforations of a particular configuration are to be made, the rotary knife additionally comprises oblique cutting surfaces or edges arranged at an angle with respect to the notched blade or blades. For example, to cut notches and shoulders united by oblique parts as described in my application Serial No. 37,757, filed August 24, 1935, the rotary knives each comprise five parts, see Figure 12, three having notched rectilinear blades 89, 90, 91 spaced from one another with a pair of oppositely disposed oblique cutters or knife sections 92, 93 arranged in the spacing intervals. These oblique cutters shown in detail in Figures 9 and 10 each comprise a pair of parallel oblique straight edges 94, 95 separated by a space equivalent to the amount of margin or overlap desired in the assembled notches and shouldered tubes. As these spaced oblique knives pass over the dead knife and cooperate with the oblique cutting edges 73 thereof, parallel cuts are made so that parallelogram pieces are detached or cut to waste. It will be appreciated that the notched knives 89, 90, 91 overlie the ends of the oblique spaced knives 94, 95 to complete the separation of the waste pieces.

The five parts of the rotary knife (Figure 12) are mounted on the cylindrical member 86 in the manner described with reference to Figure 11 so that the parts may be independently adjusted relatively to one another circumferentially of the member 86.

Figure 12:
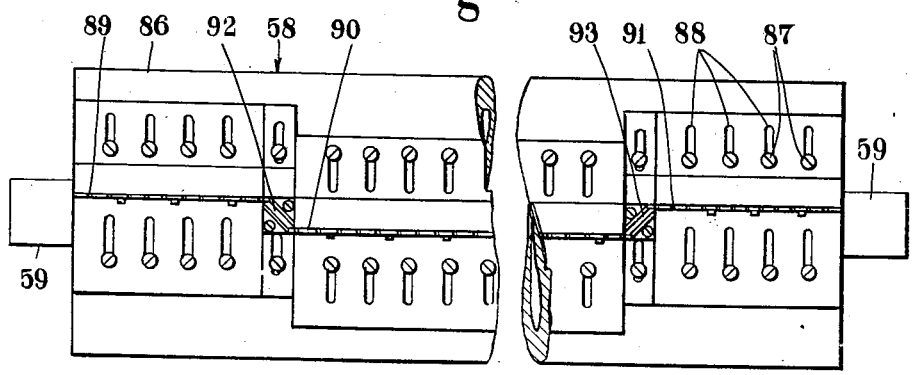
Figure 12 is a view of a rotary knife unit.

For producing a four ply bag tube as described in my application Serial No. 37,757 filed August 24, 1935, referred to above the four rotary knives of the bag tubing machine are each composed of five parts as described with reference to Figure 12, the three rectilinear blades and the oppositely disposed oblique cutters being arranged as shown diagrammatically in Figure 13. It will be appreciated from Figure 13 that the first and fourth knives 96 and 99 will perforate the webs associated therewith so as to produce deeper notched and shouldered portions than those produced by the second and third knives 97 and 98 and that the notches and shoulders produced by the third and fourth knives 98, 99 will be the reverse of those produced by the first and second knives 96, 97.

The invention may also be applied to the production of tubes for bags having a single folded end closure, comprising a nested series of independent tubes having stepped flap extensions on one face only, the stepped flaps being progressively larger throughout the series. For producing such tubes the rotary knives would have appropriate length cutters at right angles in lieu of the oblique cutters 92, 93 shown in Figure 12.

The path of travel of each web after it leaves the perforating position is such that the transverse perforations of each web are disposed in the correct relationship to those of other webs in order to produce the composite tube with overlapping margins or headings at the end, correctly and as previously referred to independent adjustment of the path of travel of the webs may be made if necessary by adjustment of the bight rollers 56.

From the bight rollers 56 the webs pass over lead rollers 100 to an assembly roller 101. The lead rollers 100, and the bight roller 56 of web 2 which also serves as a lead roller, are arranged relatively to one another and to the assembly roller so that the consecutive webs are tangent to the assembly roller at widely spaced points whereby the risk of creasing the webs is diminished. It is also to be noted that this arrangement provides varying arcs of contact of the respective webs around the assembly roller, the arc of contact of the inner web 2 being the greatest while that of the outer web 5 is the smallest, whereby any tendency of one web to influence another is minimized. Provision is made for adjusting the assembly roller 101 when required. This roller bears in plates 102 slidable in slots 103 in the machine frame, and the plates have racks 104 associated therewith which are engaged by pinions 105 mounted on a transverse spindle 106 operable by a handwheel 107 to effect adjustment of the assembly roller 101 longitudinally of the machine.

Paste or other adhesive is applied to the staggered edges or side margins of the webs at the assembly roller and it is preferred to employ an improved form of pasting device by which adhesive is applied without incurring a frictional drag upon the webs such as occurs where undriven discs or rolls are employed. This pasting device is indicated by reference numeral 108 in Figure 1a and is shown in detail in Figures 14 and 15. According to the improved arrangement a series of nozzles 109 are provided, one for each web, these nozzles each being provided with an adjustable needle valve 110 for controlling the flow of paste from the nozzles. Each nozzle is screwed or otherwise secured to a cylindrical section 111 and these sections are clamped together and to a supporting frame 112 by a bolt 113 passing centrally therethrough. A spigot joint is formed between each of the cylindrical sections 111 by means of rubber or like rings 114 thus permitting the nozzles to be adjusted or swung about the axis of the bolt 113 independently of one another. The nozzles 109 are adjusted so that their outlets are spaced away slightly from or lightly contact the web surfaces and the supporting frame 112 is secured to a depending bracket 115 (Figure 1a) fixed to the adjustable mounting of the assembly roller 101 so that the pasting device is adjustable with the assembly roller. It will be seen that the nozzles each communicate with a common chamber 116 formed by the cylindrical sections 111 and this chamber is connected by a flexible pipe line 117 to a suitable source of paste supply. As shown in Figure 1a the pipe 117 is connected to the outlet side of a pump 118 adapted to deliver paste under pressure to the chamber 116 from a paste container 119. A controlled by-pass may be provided between the pipe 117 and the container to control the delivery pressure.

The passage of the webs across and preferably out of contact with the nozzles draws the paste from the nozzles and ensures a continuous line of paste being applied to each web and it will be appreciated that should tubes be produced by the machine having fewer plys than the number of nozzles provided on the pasting device the particular nozzle (or nozzles) not required may be brought out of action by swinging it away from the assembly roll and screwing in its needle valve 110.

The assembled webs are led from the assembly roller to the tube folding mechanism comprising a former plate 120 over the edges of which the wings of the tube are folded, it being understood that the usual rollers or other aids will be employed to perfect the folding operation.

In order to reduce friction and breaking strain on the webs the usual heel of the former plate is replaced for the greater part of its width by a roller 121 which may be made telescopic. This roller 121 is carried by a suitable bracket 122 (Figures 16 and 17) which may be secured to an arm 123 by which the heel of the former plate is suspended.

At the position where the overlapping margins which are to be secured together are about to meet, or have just met, means are provided for drawing the wings or folded portions of the tube inwardly so as to preserve the correct register of the longitudinally overlapping folds or margins and also to prevent any creep or tendency of the tubes to get out of register at the transverse perforations. These inwardly thrusting means are shown in Figures 16 and 17 and comprise oblique rollers 124 and 125 mounted on the former plate 120 and over which the paper folds travel. The oblique rollers are of conical form and the smaller end of each thereof bears in the folding edge portions 126 of the former plate while the larger end of each bears in an adjustable plate 127 secured to the former plate by bolts 129 which engage slots 128 in the plate, the bearings being such as to permit the obliquity of the rollers 124 and 125 to be regulated or adjusted. Pivoted levers 130 are provided which are connected by rods 131 to the adjustable plates 127 and by means of which the obliquity of the rollers may be adjusted while the machine is in operation.

Co-operating with the oblique rollers 124, 125, is a pair of rubber covered driven rollers 132, 133 (which preferably have convex driving surfaces) mounted on articulated spindles 134, 135 so that they may be skewed or the angle of their axes altered with respect to the tube. The articulated spindles are carried in bearing brackets 136, 137 adjustably mounted on the machine frame as by means of bolts 138 engaging arcuate slots 139 in the bearing brackets and these bearing brackets may be adjusted to alter the angles of the articulated spindles by means of a handwheel 140 secured to a screwed rod 141 in threaded engagement with a fixed bracket 142 and connected to the bearing bracket 137 by a link 143. The convex roller 132 is wider than the roller 133 for the reason that this roller 132 is adapted to engage the wing or fold of the tube which requires more control, namely, the wing or fold which is adapted to be folded down upon the other wing the overlapping margins of which have previously been pasted. It is to be noted that the conical oblique roller 124 is correspondingly wider than the oblique roller 125. The rubber covered rollers 132, 133 may be driven at paper web speed or at a speed somewhat less than that of the paper so that they exercise a slipping thrust. As shown in Figures 1 and 16 the drive for these rollers is derived from the shaft 17 which has a pulley 144 secured thereon. This pulley, through the medium of a belt 145 which passes over guide pulleys 146, 147, drives a pulley 148 secured on a spindle 149 mounted in a bearing 150 and articulated to the spindle 134 of the rubber covered roller 132.

From the skewed rollers and the ends of the former plate 120 the tubes pass to the draw rollers 10 which may be of the usual character and of which a plurality of sets are shown. The draw rollers present the end of the formed tube to the first of a pair of gripping devices 151, 152. The first gripping device 151 comprises a segment or block of rubber 153 carried on a driven roller or member 154, or may be carried on arms mounted on a rotary spindle, and a metal or rubber covered roller 155 with which the rubber block is adapted to have rolling contact through the paper tube at each revolution. The rubber segment and its roller 155 are driven at slightly less than paper speed so that when the segment engages the tube of paper there is a slight retarding action while the paper tube is momentarily gripped between the surfaces.

The other gripping device 152 is disposed in advance of the first device 151 a distance equivalent to or slightly less than a bag length or a double bag length interval. For the purpose of dealing with different bag lengths on one and the same machine, the members of second gripping device 152 may conveniently be mounted on a frame or on levers adjustable longitudinally of the machine.

The second gripping device comprises a pair of rollers 156, 157 the former of which has a rubber segment 158. These rollers are rotated at a higher peripheral speed than that of the paper. The rotation of the segment 158 is synchronized with the operation of the first grippers. When the paper is gripped by both devices the first grippers 153, 155 hold or retard the standing part of the tube while at the same time the end bag length tends to be quickly advanced by the second grippers 158, 157 and thus a sudden tension is applied, breaking the end bag length of the tube off at the first set of perforations.

Between the first and second gripping devices, preferably adjustably mounted in order to provide regulation for different lengths of bag tube as in the case of the second set of grippers, a rotary cutter 159 is provided. The cutter may be of the known type comprising a pair of drums or rolls 160, 161 having a knife blade on one roll co-operating with an inset blade or edge on the other. This cutting device is adapted to come into operation where the tube is perforated at double bag length intervals to make a transverse cut to sever the double bag lengths into equal parts immediately it has been broken from the continuous tube.

Instead of employing gripping devices as above described as an alternative eccentrically mounted rotary gripping rollers may be employed which make contact with the tube by timed cam operation or the like, when a bag length has been fed forward by the draw rolls and is ready for severance or breaking away. The first set of eccentric grippers retards and holds the tube whilst the second set gives the end bag length a sudden advance to tension and break it away at the perforations.

The machine may be adapted to manufacture gusseted bag tubes by providing a gusseted former of known type with the usual gusset-forming means. In order to cope with the increased friction on the tube auxiliary driving means may be provided and applied to the tube as it passes over the former. For example, the underside of the tube may have friction driving rollers located at different points along the length of the former. Also an additional friction drive may be applied in the gussets themselves.

I claim:

1. In a machine for the manufacture of paper bag tubes, means for perforating a web of paper transversely thereof comprising in combination, a rectilinear dead knife, a series of oblique cutting edges on said dead knife, a rotary knife co-operating with the dead knife, the cutting edge of one of said knives being interrupted at spaced intervals to provide non-cutting portions, means for rotating said rotary knife, and means for feeding a web of paper between said knives.

2. In a machine for the manufacture of paper bag tubes, means for perforating a web of paper transversely thereof comprising in combination, a rectilinear dead knife, a series of spaced oblique cutting edges on said dead knife, a rotary knife for traversing the oblique cutting edges of the dead knife, said rotary knife having its cutting edge interrupted at spaced intervals to provide non-cutting portions, means for rotating the rotary knife, and means for feeding a web of paper between said knives.

3. In a machine for the manufacture of paper bag tubes, means for perforating a web of paper transversely thereof, comprising in combination, a rectilinear dead knife, a series of oblique cutting edges on said dead knife arranged in oppositely disposed sets, a rotary knife for traversing the oblique cutting edges of the dead knife, the cutting edge of one of said knives being interrupted at spaced intervals to provide non-cutting portions, means for rotating the rotary knife, and means for feeding a web of paper between said knives.

4. In a machine for the manufacture of paper bag tubes means for perforating a web of paper transversely thereof comprising, in combination, a rectilinear dead knife, a series of spaced oblique cutting edges on said dead knife arranged in oppositely disposed sets, a rotary knife for cooperation with the dead knife, said rotary knife comprising notched rectilinear blades spaced from one another with cutters arranged in the spacing intervals at an angle to the rectilinear blades, means for rotating the rotary knife, and means for feeding a web of paper between said knives.

5. In a machine for the manufacture of paper bag tubes, means for perforating a web of paper transversely thereof comprising in combination, a rectilinear dead knife, a series of spaced oblique cutting edges on said dead knife arranged in two oppositely disposed sets, a rotary knife for co-operation with the dead knife, said rotary knife comprising three notched rectilinear blades spaced from one another with a pair of oppositely disposed oblique cutters arranged in the spacing intervals, means for rotating the rotary knife, and means for feeding a web of paper between said knives.

6. In a machine for the manufacture of paper bag tubes, means for perforating a web of paper transversely thereof comprising in combination, a rectilinear dead knife, a series of spaced oblique cutting edges on said dead knife, a rotary knife comprising a cylinder with five knife sections mounted on its periphery for traversing the cutting edges of the dead knife three of said knife sections being of notched rectilinear form and spaced from one another longitudinally of the cylinder while the remaining two knife sections are arranged in the spaces between the rectilinear sections and at an angle to said rectilinear sections, means for adjusting said five knife sections circumferentially of said cylinder, means for rotating said cylinder, and means for feeding a web of paper between said rotary and dead knives.

7. In a machine for the manufacture of paper bag tubes, means for perforating a web of paper transversely thereof comprising in combination, a rectilinear dead knife, a series of oblique cutting edges on said dead knife arranged in oppositely disposed sets, a rotary knife for co-operation with the dead knife, said rotary knife being interrupted at spaced intervals to provide non-cutting portions, means for rotating said rotary knife, means for resiliently mounting said dead knife so as to afford slight give when in co-operation with the rotary knife, and means for feeding a web of paper between said rotary and dead knives.

8. In a machine for the manufacture of paper bag tubes, means for perforating a web of paper transversely thereof comprising in combination, a rectilinear dead knife, a series of spaced oblique cutting edges on said dead knife arranged in oppositely disposed sets, a rotary knife for co-operation with the dead knife and comprising three notched rectilinear blades spaced from one another with oppositely disposed oblique cutters in the spacing intervals, each oblique cutter having a pair of parallel oblique cutting edges which together with the ends of said rectilinear blades form parallelograms, means for rotating said rotary knife, and means for feeding a web of paper between said rotary and dead knives.

9. In a machine for the manufacture of paper bag tubes, means for perforating a web of paper transversely thereof comprising in combination, a rectilinear dead knife, a series of oblique cutting edges on said dead knife and arranged at an angle of approximately 45° to the plane of the knife, means for resiliently mounting said dead knife at an angle of approximately 45° so that said cutting edges thereof extend in a vertical plane, a rotary knife mounted adjacent said dead knife for co-operation with the latter, means for rotating said rotary knife, means for feeding a web of paper between said rotary and dead knives, said rotary knife having a cutting edge notched at spaced intervals for traversing the oblique cutting edges of the dead knife so that the web is perforated transversely by a series of cuts spaced from one another a distance corresponding with the notches in the cutting edge of the rotary knife.

10. A machine for the manufacture of multiply paper bag tubes comprising in combination, a plurality of perforating devices mounted in spaced relation, each perforating device comprising a rectilinear dead knife provided with a series of spaced oblique cutting edges and a rotary knife cooperating with the dead knife, one of said knives being interrupted at spaced intervals to provide non-cutting portions, means for rotating the rotary knives of said perforating devices, means for feeding a plurality of webs of paper one between each of the cooperating knives of said perforating devices for perforation transversely by said knives, tension controlling means associated with the webs for individually tensioning the webs, means for assembling the webs of paper in superposed relation after perforation by said perforating devices, tube forming mechanism to which the superposed webs are led for forming into a multiply tube, and means for dividing the formed tube into lengths by rupturing along the lines of perforations.

11. In a machine for the manufacture of multiply paper bag tubes the combination of a plurality of perforating devices arranged in spaced relation, means for feeding a plurality of webs of paper one to each of said perforating devices and means for individually controlling the tension of said webs comprising a series of draw rollers one for each web, means for driving said draw rollers, a series of guide rollers one for each web, means for displaceably mounting said guide rollers with respect to said draw rollers, and means for individually displacing said guide rollers so as to vary the arcs of contact of the webs with the draw rollers.

12. In a machine for the manufacture of multiply paper bag tubes, the combination of means for feeding a plurality of webs of paper through the machine, a plurality of spaced perforating devices, one for each web, for perforating said webs transversely by a series of spaced cuts, and means for controlling the tension of said webs comprising a series of draw rollers one for each web, means for driving said draw rollers, a series of rubber covered guide rollers one for each web, and one associated with each of said draw rollers, a plurality of pairs of arms, each pair for carrying one of said guide rollers, means for eccentrically mounting each pair of arms with respect to the axis of the associated draw roller and means for individually adjusting any one of said pairs of arms so as to cause its guide roller to increase or decrease the arc of contact of the web with its associated draw roller.

13. In a machine for the manufacture of multiply paper bag tubes the combination of forward draw rolls for drawing a plurality of webs of paper through the machine, a plurality of perforating devices one for each web for perforating the webs transversely by a series of spaced cuts, and means for controlling the tension of the individual webs comprising a series of draw rollers one for each web, means for driving said draw rollers, a series of rubber covered guide rollers one associated with each web and each draw roller, means for displaceably mounting said guide rollers with respect to their associated draw rollers, means for individually displacing said guide rollers so as to vary the arcs of contact of the webs with the draw rollers, and means for simultaneously swinging said guide rollers away from their associated draw rollers.

14. In a machine for the manufacture of multiply paper bag tubes the combination of forward draw rolls for drawing a plurality of webs of paper through the machine, a plurality of devices one for each web for perforating the webs transversely by a series of spaced cuts, a series of draw rollers, one for each web, a series of variable speed drives one for each draw roller, common driving means between said variable speed drives and the forward draw rolls, a series of guide rollers one for each web, means for displaceably mounting said guide rollers with respect to said draw rollers, and means for individually displacing said guide rollers to increase or decrease the arcs of contact of the webs with the draw rollers.

15. A machine for the manufacture of multiply paper bag tubes comprising in combination forward draw rolls for drawing a plurality of webs of paper through the machine, a plurality of perforating devices for independently perforating the webs transversely thereof during their passage through the machine, means for controlling the tension of said webs, bight rollers beneath which the webs are led from the perforating means, lead rollers over which the webs are led from the bight rollers, means for adjusting the bight rollers, an assembly roller for assembling the perforated webs in superposed relation after they leave the lead rollers, means for adjusting said assembly roller, tube forming mechanism to which the superposed webs are led for forming into a multiply tube, and means for dividing the formed tube into lengths by rupturing along the lines of perforation.

16. In combination with the machine according to claim 15, a pasting device for applying paste to the margins of the assembled webs of said assembly roller, comprising a series of nozzles, one for each web, means for mounting said nozzles for adjustment relatively to one another and to the assembly roller and means for applying adhesive under pressure to said nozzles.

17. In a machine for the manufacture of multiply paper bag tubes, the combination of means for drawing a plurality of paper webs through the machine, means for individually perforating the webs transversely thereof by a series of spaced cuts, means for assembling the webs in superposed relation, means for applying adhesive to the margins of the webs, and means for forming the assembled webs into a multiply tube comprising a former plate, means for folding the wings of the assembled webs over the edges of the former plate, an adjustable skew friction drive engaging the outside of the folded wings of the webs, and adjustable conical rollers engaging the inside of the folded wings of the webs.

18. In a machine for the manufacture of multiply paper bag tubes, the combination as claimed in claim 17 and wherein the former plate has a roller at its leading edge over which the assembled webs are led.

19. A machine for the manufacture of multiply paper bag tubes comprising in combination means for drawing a plurality of paper webs through the machine, a plurality of perforating devices, one for each web, for independently perforating the webs transversely by a series of spaced cuts, means for assembling the webs in superposed relation, tube forming mechanism for forming the superposed webs into a multiply tube and means for dividing the formed tube into lengths by rupturing along the lines of the perforations comprising two rotary gripping devices operating in synchronism one for retarding and the other for advancing the tube, each gripping device consisting of a rotary rubber segment cooperating with an opposed roller.

FOSTER GOTCH ROBINSON.